United States Patent [19] [11] 3,784,069
Stoffel [45] Jan. 8, 1974

[54] TURKEY AND ROAST LIFTER SLING
[75] Inventor: John F. Stoffel, Yonkers, N.Y.
[73] Assignee: Stoffel Seals Corporation, Tuckahoe, N.Y.
[22] Filed: Mar. 7, 1972
[21] Appl. No.: 232,383

[52] U.S. Cl. .................. 224/49, 24/123 B
[51] Int. Cl. ............................ B65d 63/16
[58] Field of Search ............. 224/49; 24/123 W, 24/123 B

[56] References Cited
UNITED STATES PATENTS
3,214,072  10/1965  Brown .................................. 224/49
2,889,603  6/1959  Joy et al. ......................... 24/123 W
3,512,223  5/1970  Willinger ......................... 24/123 B
3,292,831  12/1966  Moen .................................. 224/49
1,931,808  10/1933  Andersen ........................... 224/49
1,253,462  1/1918  Brown ............................. 24/123 B Primary Examiner—Robert G. Sheridan
Assistant Examiner—Kenneth Noland
Attorney—A. Yates Dowell, Jr.

[57] ABSTRACT

Apparatus for use in lifting a large fowl or roast from a roaster pan after the comestible has been cooked. The apparatus includes flexible cords joined together at selected areas to provide loops at opposite ends and such loops are disposed about opposite ends of the comestible.

2 Claims, 2 Drawing Figures

PATENTED JAN 8 1974　　　　　　　　　　　3,784,069

3,784,069

TURKEY AND ROAST LIFTER SLING

BACKGROUND OF THE INVENTION

1. Field of the Invention

This invention relates generally to apparatus used in the preparation of food of various kinds and relates particularly to apparatus for removing meat, fowl, and other comestibles from a cooking container so that the comestible can be sliced for serving.

2. Description of the Prior Art

Heretofore efforts have been made to provide slings for removing meat and fowl from a roaster or the like including means having a substantially rigid tray with lifting handles swingably mounted thereon to facilitate the removal of a relatively large fowl such as a turkey, goose or the like, or a relatively large piece of meat such as a roast from a roasting pan. The fowl or meat must be removed from the tray onto a platter or the like by a sliding motion before the comestible can be sliced for serving.

Some meat and fowl turner and lifter devices have been provided including a sling of cord, chain, or webbed material adapted to extend around opposite sides of the meat or fowl being cooked. The meat or fowl can be rotated during cooking by a longitudinal movement of the loops to cause a rolling motion in the fowl or meat. Examples of this type of device are the U.S. Pat. Nos. to Williams 2,337,142, Shreiner 2,514,098, and Moen 3,292,831.

U.S. Pat. No. 3,214,072 to Brown discloses a sling having a generally figure eight configuration with loops formed in opposite ends of a flexible strap of webbing material joined together in the center. A spacer bar is disposed within each of the loops to form a mattress supporting cradle and each of the loops extends outwardly from the end of the mattress to facilitate carrying the mattress.

SUMMARY OF THE INVENTION

The present invention is a simple, economical sling having a central portion with opposed loops at opposite ends on which a fowl, roast or other comestible is adapted to be placed in such a manner that the loops are disposed around opposite sides of the comestible in spaced relationship to each other so that such comestible can be easily lifted from the roaster pan in a manner that it cannot accidentally slip from the sling during movement onto a platter. The sling is made of a material which cannot cause damage to the carving tools and therefore the sling can be left under the comestible during the carving process and can be used to facilitate removal of the carcass or the uncut portion of the fowl or roast from the platter for storage purposes.

It is an object of the invention to provide a simple sling of flexible substantially non-stretchable material having a central portion with loops at opposite ends adapted to at least partially encircle a fowl or roast to facilitate removal from a cooking container without slipping and which will not damage carving tools if accidentally struck thereby.

DESCRIPTION OF THE PREFERRED EMBODIMENT

Figure 1:
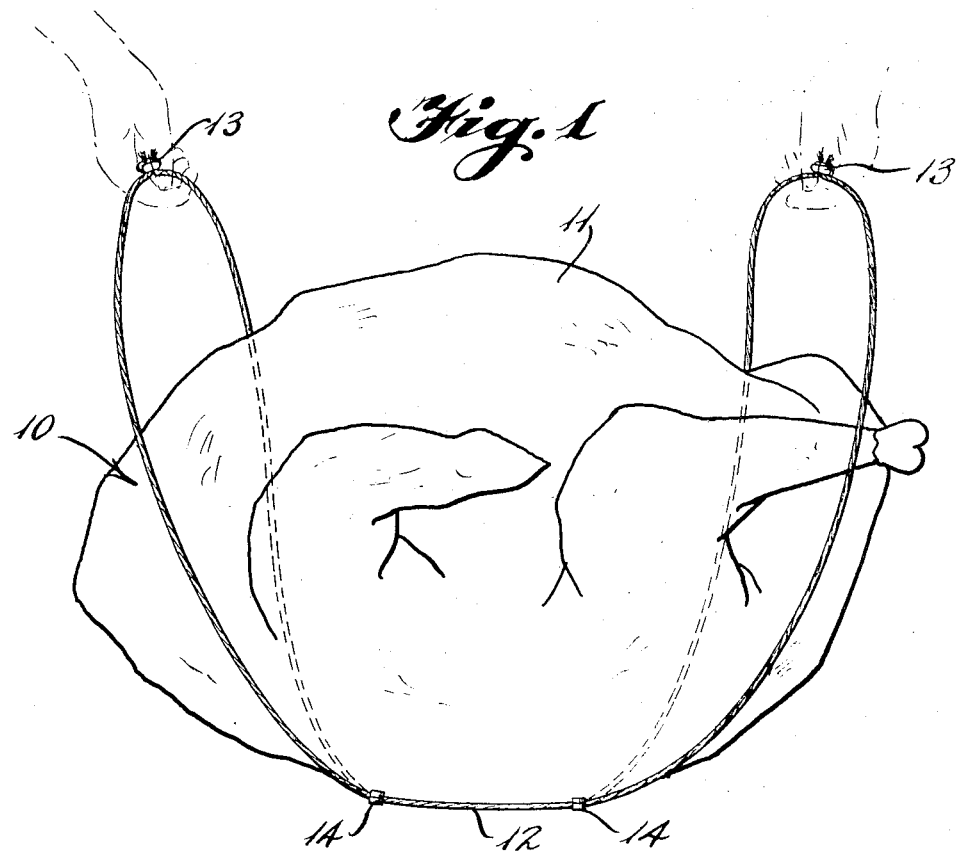
FIG. 1 is a perspective illustrating one application of the invention.
Figure 2:
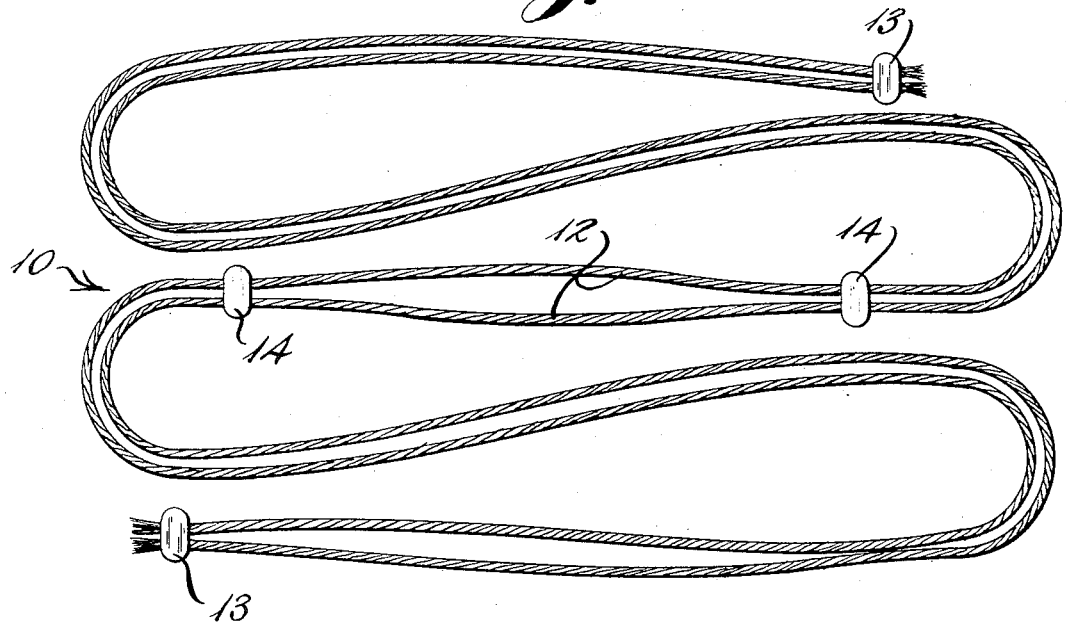
FIG. 2 is an enlarged top plan view illustrating the sling per se.

With continued reference to the drawing, a sling 10 is provided for lifting a fowl, roast or other comestible 11 from a roasting pan, platter or other container (not shown). As illustrated, the sling 10 includes a pair of flexible substantially non-stretchable cords 12 of heat resistant material such as cotton or other natural or synthetic material which retains its strength up to approximately 500° F. The cords are of any desired length and are connected together at opposite ends by clips or other outer fastening means 13. The clips 13 are constructed of thermoplastic material such as synthetic organic polymeric resin, including chlorotrifluoroethylene, nylon, polyethylene, and the like. The clips preferably are injection molded onto the cords so that they are permanently bonded thereto and the cords will not pull out of the clips at elevated temperatures even when the clips are slightly softened.

Spaced inwardly from the ends of the cords are a pair of inner clips 14 of the same material as the clips 13. Such inner clips are spaced from each other a short distance normally three to six inches apart to provide a central portion of the sling having a fixed length. The outer clips 13 are spaced from the inner clips 14 any desired distance although a distance of 12 inches to 15 inches has been found satisfactory. This spacing will accommodate a 10 to 25 pound turkey or a relatively large roast.

Preferably, the cords 12 are spaced apart approximately one-sixteenth of an inch when the clips 13 and 14 are molded thereon so that the material of the clips completely surrounds the cords. The central portions of cord between the inner clips 14 normally remain straight and in side by side relationship, while the lengths of cords between the inner and outer clips are spread apart to form open loops. The central portions of the cord normally are located along the bottom of the comestible so that the inner ends of the loops engage the comestible in spaced relationship to each other.

It is noted that instead of dual cords, as illustrated, a single cord could be provided the opposite ends of which are bent back upon themselves and connected to the body of the cord by inner clips 14 to form the loops on opposite ends of the cord while the central portion is a single length of cord.

Also, it is comtemplated that the clips 13 and 14 could be omitted and the cords could be knotted together to form a sling having a central portion with open loops at opposite ends.

In the operation of the device, when a fowl, roast or other comestible is ready for the oven, the sling is placed lengthwise of the roaster pan with the inner clips 14 disposed generally centrally of the pan and along the longitudinal axis thereof. The comestible is placed on top of the clips 14 after which the loops formed in the opposite ends of the sling are spread apart so that they are placed on opposite sides of the comestible and permitted to rest thereon. After roasting is completed, the loops at the opposite ends of the sling are grasped firmly so that the comestible can be raised from the roasting pan. Opposite sides of the loops engage the comestible and normally are at least partially imbedded therein by the weight of the comestible to prevent slippage. Should the comestible tend to stick to the pan, a slight rocking motion should dislodge it sufficiently for lifting from the pan.

After the comestible has been lifted from the pan, it can be placed on a platter or other serving dish on which it can be sliced for serving individual portions. When the comestible is placed on the carving board or platter, the sling can be left below the comestible and the loops merely removed from the upper portion and left on the platter. When it is desired to remove the comestible from the platter after sufficient material has been removed for immediate serving purposes, the loops can be replaced on opposite sides and the comestible can be transferred to a refrigerator or the like for storage and subsequent use.

I claim:

1. A small lightweight sling for handling comestibles comprising only two independent flexible cords made of heat resistant material, a first pair of clips injection molded to opposite ends of said cords and connecting said cords together, a second pair of clips injection molded to each of said cords in spaced relationship to said first clips, said second clips being spaced from each other and providing a relatively straight side-by-side portion of said cords adapted to underlie the comestible, said first and second clips being formed of thermoplastic material which resists heat of approximately 500° F, the portions of said cords between said first and second clips forming a loop at each end of said sling, the inner portions of each of said loops adjacent to said second clips straddling and selectively engageable with spaced portions of the comestible, and the outer portions of said loops adjacent to said first clips being selectively grasped by a person for lifting the comestible, whereby the inner portions of the loops maintain the comestible in fixed position on said sling when the outer portions of the loops are raised by a person.

2. The structure of claim 1 in which said cords are made of cotton.

* * * * *